US011794999B2

(12) United States Patent
Pietrowicz et al.

(10) Patent No.: US 11,794,999 B2
(45) Date of Patent: Oct. 24, 2023

(54) SYSTEM OF BUFFER STORAGE AND SEQUENCING OF ITEMS COMPRISING TWO ELEVATORS

(71) Applicant: SAVOYE, Dijon (FR)

(72) Inventors: Stephane Pietrowicz, Fixin (FR); Jean-Michel Collin, Merceuil (FR)

(73) Assignee: SAVOYE, Dijon (FR)

( * ) Notice: Subject to any disclaimer, the term of this patent is extended or adjusted under 35 U.S.C. 154(b) by 907 days.

(21) Appl. No.: 16/305,640

(22) PCT Filed: Apr. 10, 2017

(86) PCT No.: PCT/EP2017/058563
§ 371 (c)(1),
(2) Date: Sep. 14, 2020

(87) PCT Pub. No.: WO2017/207152
PCT Pub. Date: Dec. 7, 2017

(65) Prior Publication Data

US 2021/0009348 A1 Jan. 14, 2021

(30) Foreign Application Priority Data

May 30, 2016 (FR) ...................................... 1654863

(51) Int. Cl.
*B65G 1/04* (2006.01)
*B65G 1/06* (2006.01)
(Continued)

(52) U.S. Cl.
CPC ............ *B65G 1/0478* (2013.01); *B65G 1/06* (2013.01); *G06Q 10/04* (2013.01);
(Continued)

(58) Field of Classification Search
None
See application file for complete search history.

(56) References Cited

U.S. PATENT DOCUMENTS 6,854,583 B1 * 2/2005 Horn .................... B65G 49/068 198/346.2
8,205,981 B1 * 6/2012 Marino .................. B41J 11/001 347/101

(Continued)

FOREIGN PATENT DOCUMENTS

DE 29724039 U1 11/1999
EP 1681247 A1 7/2006
FR 2989070 A1 10/2013

OTHER PUBLICATIONS

English Translation of Written Opinion of the International Searching Authority dated Jun. 29, 2017 for corresponding International Application No. PCT/EP2017/058563, filed Apr. 10, 2017.

(Continued)

*Primary Examiner* — Kavel Singh
(74) *Attorney, Agent, or Firm* — David D. Brush; Westman, Champlin & Koehler, P.A.

(57) ABSTRACT

A system for buffer storage and sequencing of items that receives unsequenced items and delivers sequenced items is provided. The system includes: a buffer storage unit having N input levels each having a FIFO conveyor, where N≥2; reciprocating input and output elevators positioned respectively at the input and output of N input levels; and a control unit configured to organize, under a constraint of delivery to at least one forward output conveyor of at least one sequence of items, various movements of items (from at least one forward input conveyor to the reciprocating input elevator, from the reciprocating input elevator to the N input levels, from the N input levels to the reciprocating output elevator, and from the reciprocating output elevator to the at least one forward output conveyor).

16 Claims, 12 Drawing Sheets

(51) Int. Cl.

| | |
|---|---|
| ***G06Q 10/04*** | (2023.01) |
| ***G06Q 10/0631*** | (2023.01) |
| ***G06Q 50/28*** | (2012.01) |
| ***B65G 1/137*** | (2006.01) |

(52) U.S. Cl.

CPC ....... *G06Q 10/06315* (2013.01); *G06Q 50/28* (2013.01); *B65G 1/1376* (2013.01)

(56) References Cited

U.S. PATENT DOCUMENTS

| | | | | |
|---|---|---|---|---|
| 8,276,739 | B2 * | 10/2012 | Bastian, II ........... | B65G 1/1375<br>414/277 |
| 9,205,981 | B2 * | 12/2015 | Valentin ............. | B65G 47/5109 |
| 2006/0245858 | A1 | 11/2006 | Suess | |
| 2015/0158677 | A1 | 6/2015 | Philipp et al. | |

OTHER PUBLICATIONS

International Search Report dated Jun. 20, 2017 for corresponding International Application No. PCT/EP2017/058563, filed Apr. 10, 2017.

Written Opinion of the International Searching Authority dated Jun. 20, 2017 for corresponding International Application No. PCT/EP2017/058563, filed Apr. 10, 2017.

French Search Report and Written Opinion dated Feb. 6, 2017, for corresponding French Application No. 1654863, filed May 30, 2016.

Notification under Article 94(3) EPC dated Dec. 3, 2019, for corresponding European Application No. 17717140.2.

Chinese Office Action dated May 19, 2021, for corresponding Chinese Application No. 201780032212.X.

* cited by examiner

SYSTEM OF BUFFER STORAGE AND SEQUENCING OF ITEMS COMPRISING TWO ELEVATORS

CROSS-REFERENCE TO RELATED APPLICATIONS

This Application is a Section 371 National Stage Application of International Application No. PCT/EP2017/058563, filed Apr. 10, 2017, which is incorporated by reference in its entirety and published as WO 2017/207152 A1 on Dec. 7, 2017, not in English.

1. TECHNICAL FIELD

The field of the invention is that of logistics.

The present invention relates more specifically to a system of a buffer storage and sequencing of loads, configured to receive non-sequenced loads coming from at least one external unit (for example an automated storage/removal warehouse) and to supply sequenced loads to at least one preparing station. The expression "to supply sequenced loads" refers to the supply, under a delivery constraint, of at least one sequence comprising loads in a desired sequential order.

The present invention can be applied to any type of preparing station, and especially but not exclusively to:

- stations for preparing customer orders (also called "picking stations") where the preparing is done by the picking of items or goods from storage containers (also called "load sources"): an operator (or a robot) receives a pick list (on paper, on a terminal screen, in voice form, or in the form of computer tasks (when it is a robot), etc.). For each package to be shipped (also called a "shipping container" or "target load"), this list informs the operator or robot about the quantity of each type of items or goods that he or it must collect in storage containers and group together in the package to be shipped; and
- stations for the palletization of storage containers (also called "source loads") themselves containing items: an operator (or a robot) receives a pick list (on paper, on a computer screen, in voice form, in the form of computer tasks (when it is a robot), etc. For each pallet to be shipped (also called a "shipping container" or "target load"), this list informs the operator or robot about the quantity of storage containers of each type (for example cardboard boxes) that he must collect and unload onto the pallet to be shipped.

2. TECHNOLOGICAL BACKGROUND

Referring now to FIG. 1, a top view is presented of an example of a known configuration for an automated storage system for preparing customer orders comprising:

- an automated storage/removal warehouse 7 comprising several sets (two in this example) each formed by an alley 7*a*, 7*a*' feeding, on either side, a storage shelf 7*b*, 7*c*, 7*b*', 7*c*' with several superimposed stacking levels;
- a set of conveyors taking the source loads from the automated warehouse 7 up to the preparing stations and vice versa. In the example of FIG. 1, we can distinguish:
  - for the forward or outbound operation (i.e. from the automated warehouse 7 up to the preparing stations), conveyers referenced 9*a* and 9*a*' (one per alley) as well as 6 and 8; and
  - for the return operation (i.e. from the preparing stations up to the automated warehouse 7), conveyers referenced 8', 6' as well as 9*b* and 9*b*' (one per alley); in this example, the conveyers 6' and 8' are superimposed on the conveyers 6 and 8;
- several customer-order preparing stations 10*a* to 10*f*, each occupied by an operator 1*a* to 1*f* and extending perpendicularly to the conveyors referenced 8 and 8'; and
- a management system (also called a management unit) that is a computer-based central management system responsible for managing the entire system (the automated storage/removal warehouse 7, the set of conveyers 6, 6', 8, 8', 9*a*, 9*a*', 9*b* and 9*b*' and the preparing stations 10*a* to 10*f*).

The management system also manages the list of customer orders associated with each shipping container (target load) and therefore the sequential order of the customer order lines forming this list, as a function of the location of the storage containers (source loads) in the warehouse, the availability of the trolleys and the elevators of the automated warehouse 7 as well as requirements in terms of items and goods of the different shipping containers to be prepared that succeed one and other at the preparing station. The purpose of this is to optimize all the movements and the preparation times for the shipping containers and ensure synchronization between the arrival, at the preparation station, of a shipping container and the corresponding storage containers (containing goods indicated in the customer order list associated with this storage container).

In the example of FIG. 1, each preparing station comprises two conveyor circuits: a first conveyor circuit for the storage containers, formed by two horizontal columns of conveyors; one column (the forward or outbound column 2) for shifting these storage containers from the third sub-set of conveyors 8 up to the operator 1*a* and the other (the return column 3) for the reverse movement; and a second circuit of conveyors for the shipping containers, formed by two horizontal columns of conveyors: one (forward or outbound column 4) for shifting the shipping containers from the third sub-set of conveyors 8 up to the operator 1*a* and the other (return column 5) for the reverse movement.

A buffer storage function (also called a "accumulation function") for buffering a determined quantity of containers upstream to the operator (or automaton) is set up in each of the first and second circuits, by the forward column 2 and 4 (consisting of classic horizontal conveyers). A storage container therefore makes the following journey: it is picked up by a trolley in the automated warehouse 7, and is then conveyed successively by one of the conveyers 9*a* and 9*a*' (depending on whether it arrives at the alley 7*a* or 7*a*') and by the conveyers 6 and 8 and finally by the conveyers of the forward or outbound column 2 to be presented to the operator. In the other direction (after presentation to the operator), the storage container makes the reverse journey: it is conveyed by the conveyors of the return column 3, then by the conveyers 8' and 6' and finally by one of the conveyers 9*b* and 9*b*' (depending on whether it is returning to the alley 7*a* or the alley 7*a*') and is then re-positioned in the automated warehouse 7 by means of a trolley.

As mentioned further above, the containers (source loads and target loads) must be presented to the operator in a desired sequential order forming at least one determined sequence. Classically, this sequential order of arrival is pre-determined by the management system (i.e. it is determined, for each container, before this container reaches the preparing station) and, if necessary, recomputed during the conveyance of the containers from the exit of the automated warehouse 7 to the preparing station (for example to take account of a malfunction of an element of the system).

In a first known (standard) implementation, a first level of sequencing is obtained by the deposition of the pre-sequenced loads on each of the conveyers 9*a* and 9*a*', (there are therefore constraints on the automated warehouse 7). In other words, the loads deposited on the conveyer 9*a* are in a sequential order consistent with that of the final desired sequential order and the loads deposited on the conveyer 9*a*' are also in a sequential order consistent with that of the final desired sequential order. Then, a second level of sequencing is achieved through the deposition on the conveyer 6, in the final desired sequential order, of the loads coming from the conveyers 9*a* and 9*a*'. For example, for a sequence of seven loads, if the loads of ranks 1, 2, 4 and 5 are stored in the alley 7*a*, they are deposited in this order on the conveyer 9*a* and if the loads of the ranks 3 and 6 are stored in the alley 7*a*', they are deposited in this order on the conveyer 9*a*'; then, the seven loads are deposited on the conveyer 6 in ascending order (from 1 to 7) of their ranks.

In a second known implementation, in order to relax the constraints on the automated warehouse 7, it is accepted that the containers will not exit the automated warehouse 7 in the desired sequential order (i.e. the order in which they must be presented to the operator). An operation therefore needs to be carried out for sequencing the containers between the automated warehouse 7 and the preparing station where the operator is situated. The elimination of the sequencing constraints that usually weigh on the automated warehouse 7 significantly increases the performance of this automated warehouse (and more generally of the different upstream devices) and therefore makes it possible to reduce its size and complexity and therefore its cost. In the example of FIG. 1, this sequencing operation is performed as follows: the storage containers circulate on the conveyers 6, 8, 8' and 6' and when the storage containers awaited on the conveyers of the forward column 3 come before this column (in order to complete the sequence of storage containers awaited at the preparing station), this storage container is transferred to the conveyers of the forward column 3. This method is performed for each of the storage containers awaited in the sequence (i.e. in the desired sequential order of arrival at the preparing station).

The two known implementations (based on classic horizontal conveyers) mentioned here above for carrying out the buffer (accumulation) storage functions and sequencing functions have several drawbacks.

First of all, they consume an excessive of amount of $m^2$ for a small running surface height (750 mm typically). An example of this excessive footprint is the fact that the surface area needed for six customer-order-preparing stations (as in the example of FIG. 1) is about 100 $m^2$.

Another drawback is that the density on the ground of classic horizontal conveyors (in the preparing stations) is such that it makes it difficult to obtain maintenance access to these conveyors (the conveyor coverage area is too dense).

Another drawback is that, without further increasing the footprint of the preparing station (by increasing the length of the forward column of each of the first and second circuits), it is not possible to increase the number of containers that can accumulate (by buffer storage) upstream to the operator (or automaton).

The invention, in at least one embodiment, is aimed especially at providing a system of buffer storage and sequencing of loads that can overcome the drawbacks of the prior art technique of FIG. 1.

3. SUMMARY OF THE INVENTION

In one particular embodiment of the invention, a system of buffer storage and load sequencing is proposed, configured to receive non-sequenced loads coming from at least one external unit through at least one entering forward conveyor, and provide sequenced loads to at least one preparing station through at least one exiting forward conveyor included in said system, said system comprising:

a buffer storage unit comprising N entrance levels disposed vertically, each of the N entrance levels comprising a "first-in first-out" type conveyor in a first direction and having a single entrance and a single exit, with $N \geq 2$;

an entering reciprocating lift or elevator and an exiting reciprocating lift or elevator of a discontinuous type positioned respectively so as to be facing single entrances and facing single exits of the N entrance levels; and a management unit configured to organize, under a constraint of delivering on said at least one exiting forward conveyor at least one sequence comprising loads in a desired sequential order: first movements of loads from said at least one entering forward conveyor towards the entering reciprocating elevator, second movements of loads from the entering reciprocating elevator to the single entrances of the N entrance levels of the buffer storage unit, third movements of loads from the single exits of the N entrance levels of the buffer storage unit towards the exiting reciprocating elevator, and fourth movements of loads from the exiting reciprocating elevator to said at least one exiting forward conveyor.

The general principle of the proposed system consists in carrying out a buffer storage and load sequencing functions through the use, according to a wholly novel and inventive approach, of two reciprocating elevators (entering and exiting respectively) in combination with a buffer storage unit under the control of a management unit configured to organize various movements of loads between these entities.

Said at least one external unit (which gives non-sequenced loads) belongs for example to the following non-exhaustive list:

an automatic system (for example an automated storage/removal warehouse);

a semi-automatic system;

a manual system;

another system of buffer storage and sequencing of loads;

a combination of at least two of the above systems.

The sequencing (ordering) capacity of the proposed system is linked to the quantity of loads that can be temporarily stored in the buffer storage unit.

The proposed solution has numerous advantages, especially but not exclusively:

minimizing (and even in certain cases totally eliminating) the constraints of sequencing at exit from the external unit or units by a sequencing downstream from this unit or these units and as close as possible to the preparing stations: this minimizing (or elimination) of constraints reduces the size and complexity and therefore the cost of the external unit or units;

reducing the footprint;

optimizing the efficiency of the overall system (including especially the external unit or units, the buffer storage and sequencing system and the preparing stations);

optimizing the reactivity of the overall system;

handling of multiple-format loads if motor-driven rollers are used;

optimizing costs if the overall system comprises several preparing stations (pooling of the buffer storage and sequencing system);

etc.

At the exit from the buffer storage and sequencing system several types of sequences of loads can be obtained, especially but not exclusively:

- a sequence comprising solely source loads, each source load being a storage container of goods or items; or
- a sequence comprising solely target loads, each target load being a container for shipping an item or items; or
- a sequence comprising a target load, which is a container for shipping an item or items followed by at least one source load which is a storage container for an item or for items.

Several buffer and storage sequencing systems (each made according to the proposed solution) can be used in parallel. For example, upstream to at least one preparing station, a first buffer storage and sequencing system is used solely for source loads and, in parallel, a second buffer storage and sequencing system is used solely for target loads.

Various implementations and characteristics are specified in the set of claims. They are also described in detail (with their associated advantages) and illustrated through examples in the rest of description.

In another embodiment of the invention, a method is proposed for generating at least one sequence comprising loads in a desired sequential order, said method being implemented by the above-mentioned system (according to any one of the possible implementations) and comprising the following steps:

- the entering reciprocating elevator carries out a pre-sequencing operation by placing the loads of said at least one sequence on the unique entrances of the N entrance levels of the buffer storage unit, in compliance with a first rule according to which, on each of the N entrance levels, a given load possessing a given rank within said at least one sequence should not be preceded by another load of a rank higher than the given rank; and
- the exiting reciprocating elevator carries out a final sequencing operation in picking the loads of said at least one sequence on the single exits of the N entrance levels of the buffer storage unit according to the desired sequencing order.

4. LIST OF FIGURES

Other features and advantages of the invention shall appear from the following description, given by way of a non-exhaustive and indicatory example and from the appended drawings of which:

FIG. 1, already described with reference to the prior art, is a top view of an automated customer-order preparing system;

FIG. 2 is a side view of a first example of a buffer storage and load sequencing system according to the invention;

FIG. 2*a* illustrates a variant of the first example of FIG. 2;

FIG. 2*b* illustrates another variant of the first example of FIG. 2;

Figure 9:
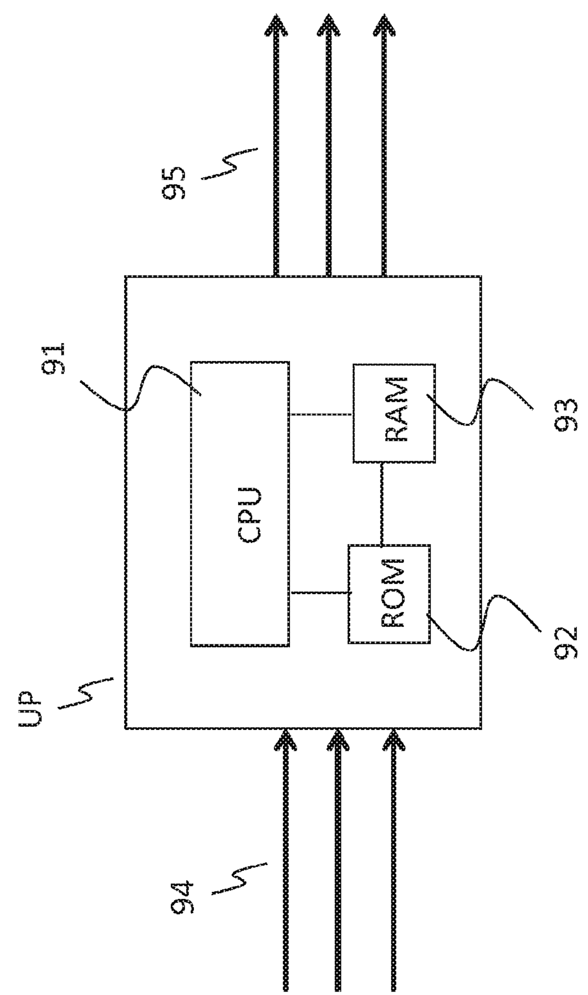
Figure 10:
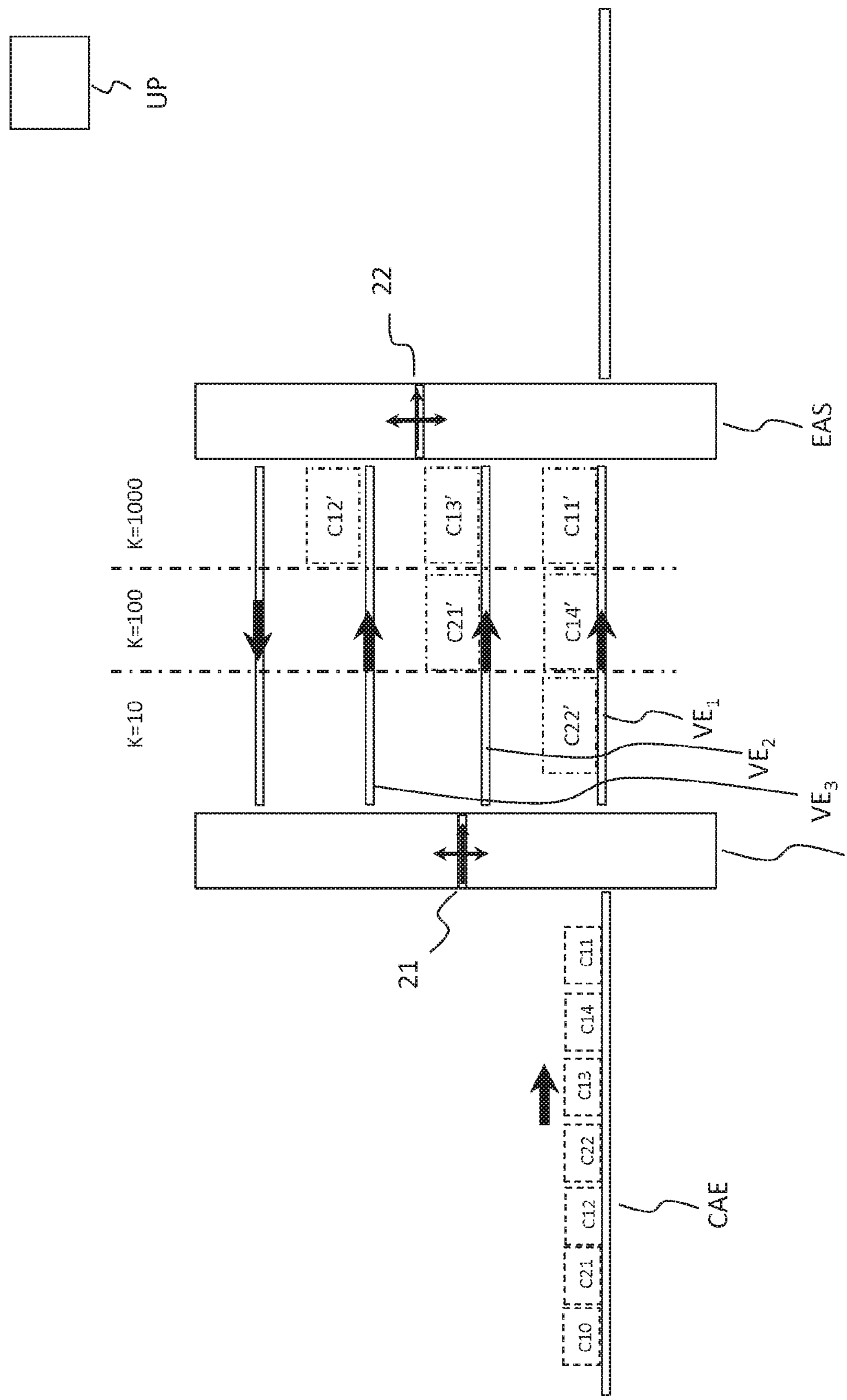

FIG. 9 presents an example of a structure of a management unit according to one particular embodiment of the invention; and FIG. 10 illustrates an example of a configuration requiring the execution of the recirculation process.

5. DETAILED DESCRIPTION

In all the figures of the present document, the identical elements and steps are designated by one and the same numerical reference.

Figure 1:
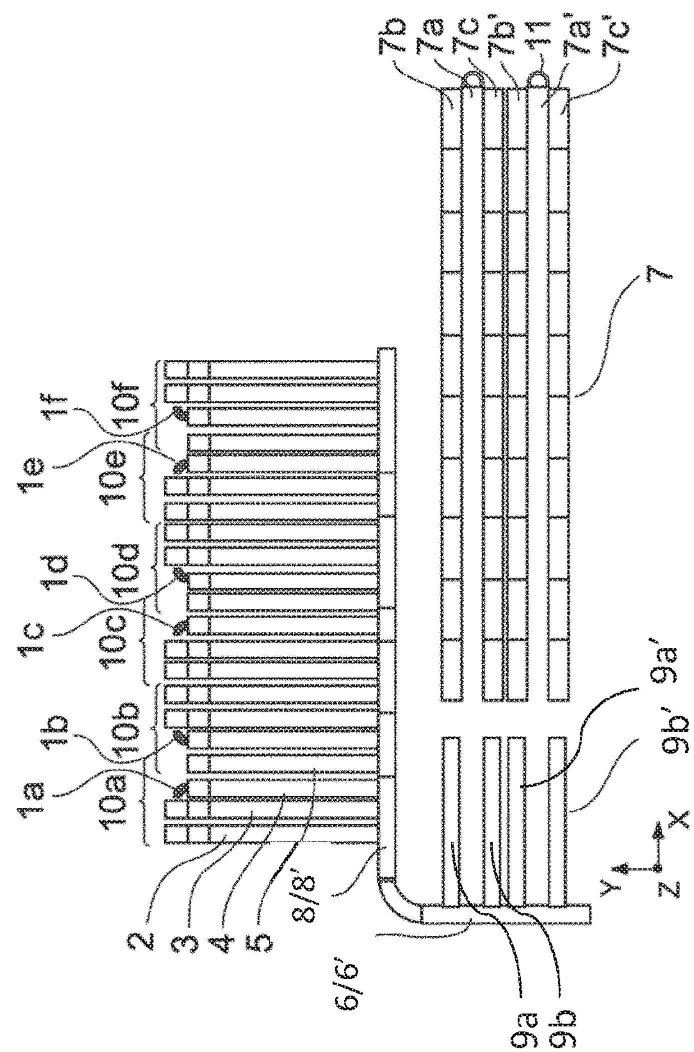
Figure 2:
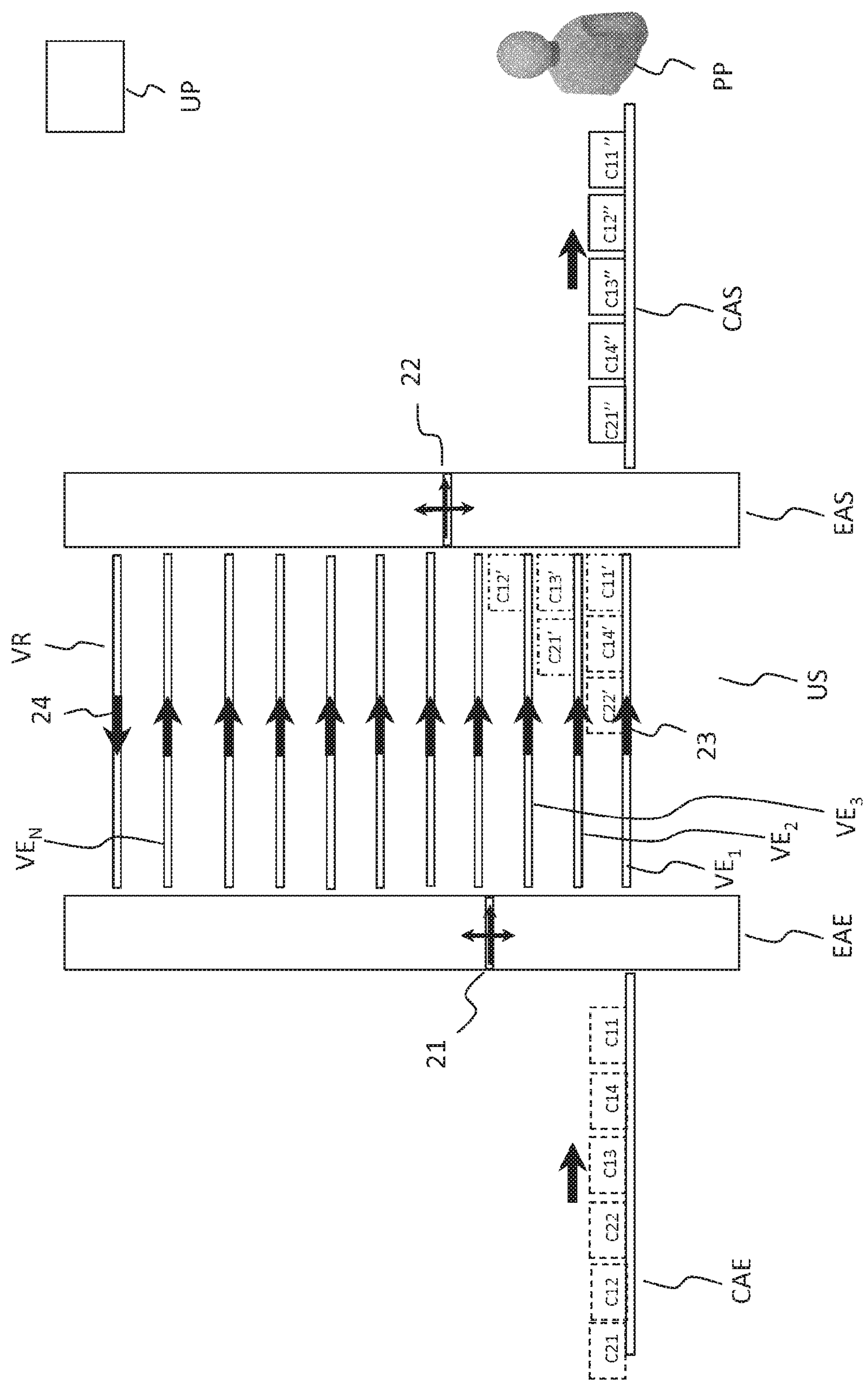

FIG. 2 illustrates a first example of a buffer storage and load sequencing system according to the invention. It is configured to receive non-sequenced loads coming from an external unit (not shown) through an entering forward conveyer CAE and to provide sequenced loads to a preparing station PP (occupied by an operator or a robot) via an exiting forward conveyor CAS. The external unit is for example an automated storage/removal warehouse.

In one variant, the external unit is another buffer storage and load sequencing system. In another variant, the buffer storage and load sequencing system receives non-sequenced loads coming from several external units (either via several entering forward conveyors CAE each specific to one of the external units or via one entering forward conveyor CAE used jointly by several external units).

The buffer storage and load sequencing system comprises an entering reciprocating elevator EAE, an exiting reciprocating elevator EAS, a buffer storage unit US and a management unit UP.

The entering reciprocating lift or elevator EAE and the exiting reciprocating elevator EAS are vertical discontinuous type elevators, each comprising a single nacelle 21, 22 performing alternate vertical movements (the nacelle rises and descends in alternation). By opposition, a "continuous elevator" (also called a paternoster) is a vertical elevator comprising a plurality of nacelles circulating in a closed loop without any alternating movement. The single nacelle 21, 22 is a one-load nacelle (it comprises a single level comprising a single location configured to receive one load). Thus, the elevators EAE, EAS are simple low-cost units.

The unique nacelle location is for example equipped with a motor-driven conveyor section (or any other transfer device) enabling the transfer of a load onto or out of the nacelle. In one variant, the nacelle location is equipped with idlers or idle rollers, the motion of which is for example is provided by a collapsible mechanical means positioned at the end of another piece of equipment (a conveyor or buffer location). Other means for putting elements into motion can be envisaged.

In another variant, the single nacelle of each of the elevators EAE, EAS is a multi-load nacelle (it comprises several levels and/or several load locations per level).

In another variant, the elevators EAE and EAS are vertical discontinuous type elevators each comprising several nacelles, each carrying out alternating vertical motions (the nacelle rises and descends in alternation). Each nacelle comprises one or more levels and/or one or more load locations per level.

The buffer storage unit US comprises:

- N entrance levels $VE_1$ to $VE_N$, (each comprising a "First-in first-out" or FIFO) type conveyor in a first direction (indicated in FIG. 2 by black arrows oriented from left to right, especially the one referenced 23) with N≥2 (for example, N=9 in one particular implementation); and
- a recirculation level VR comprising a "first-in first-out" type conveyor in a second direction (indicated in FIG. 2 by a black arrow oriented from right to left and referenced 24) opposite to the first direction. The recirculation level VR can be positioned at any stage. In one variant, the buffer storage unit US comprises several recirculation levels.

The entering reciprocating elevator EAE and the exiting reciprocating elevator EAS are positioned respectively at the entrance and exit of the N entrance levels of the buffer storage unit US. The nacelle 21 of the entering reciprocating elevator EAE can come into a position of facing the entrance of each of the N entrance levels of the buffer storage unit US to insert a load therein. It can also come into a position facing the exit from the recirculation level VR in order to remove a load therefrom.

The nacelle 22 of the exiting reciprocating elevator EAS can come into a position of facing the exit of each of the N entrance levels of the buffer storage unit US to remove a load therefrom. It can also come into a position of facing the entrance of the recirculation level VR in order to insert a load therein.

Figure 2A:
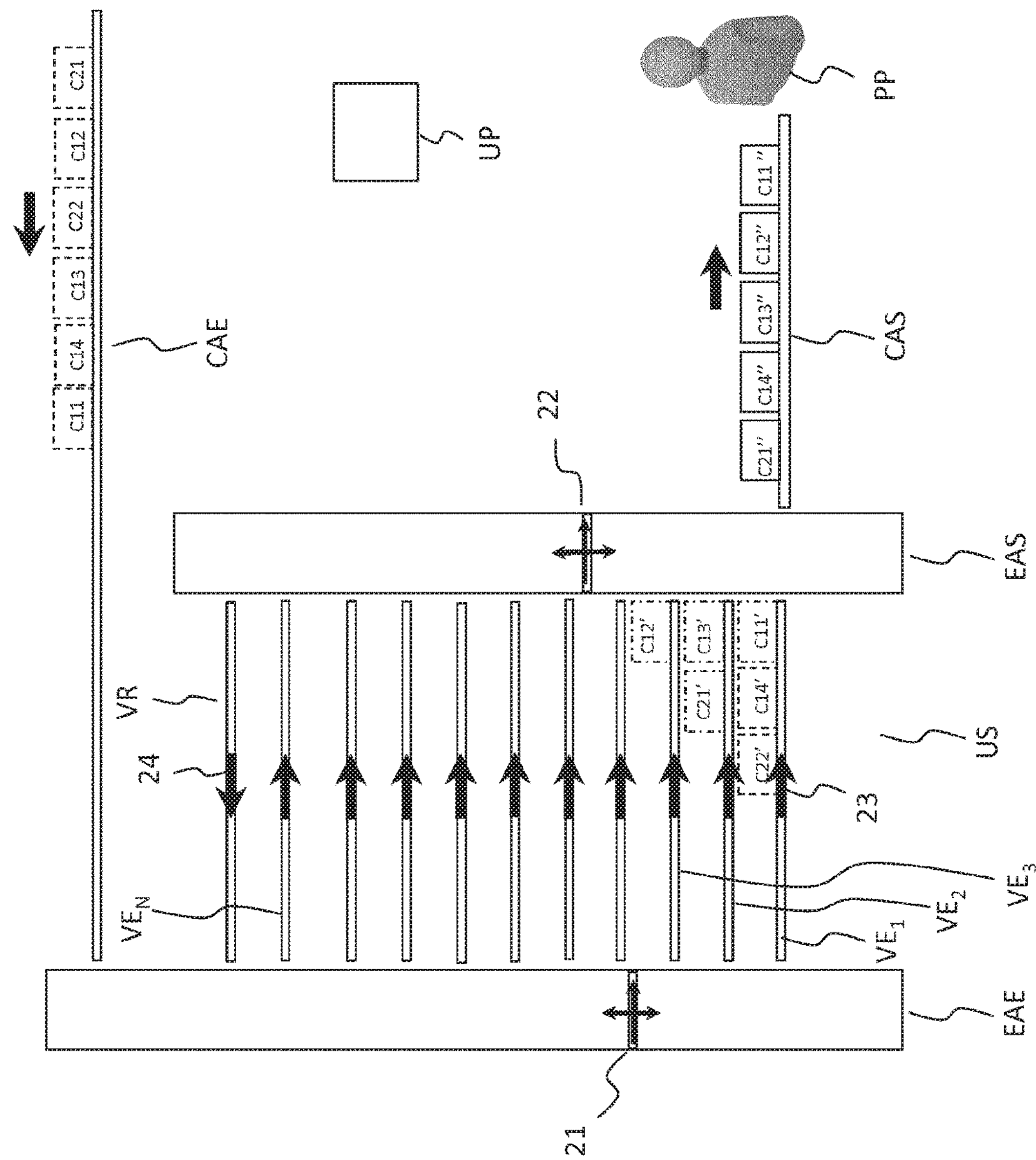

The entering forward conveyor CAE occupies a position enabling a direct exchange of loads with the entering reciprocating elevator EAE. In other words, a load can pass directly from the one to the other. In the example of FIG. 2, the entering reciprocating elevator EAE is positioned between the entering forward conveyor CAE and the buffer storage unit US and the entering forward conveyor CAE is aligned vertically with the entrance level referenced $VE_1$ of the buffer storage unit US. In variants, the entering forward conveyor CAE can occupy other vertical positions and especially can be aligned vertically with any one of the N entrance levels $VE_1$ to $VE_N$ of the buffer storage unit US or again with the recirculation level VR. In other variants (especially the one illustrated in FIG. 2*a*), the entering forward conveyor CAE and the buffer storage unit US are positioned on the same side of the entering reciprocating elevator EAE (in this case the entering forward conveyor CAE is positioned above or beneath the buffer storage unit US).

Figure 2B:
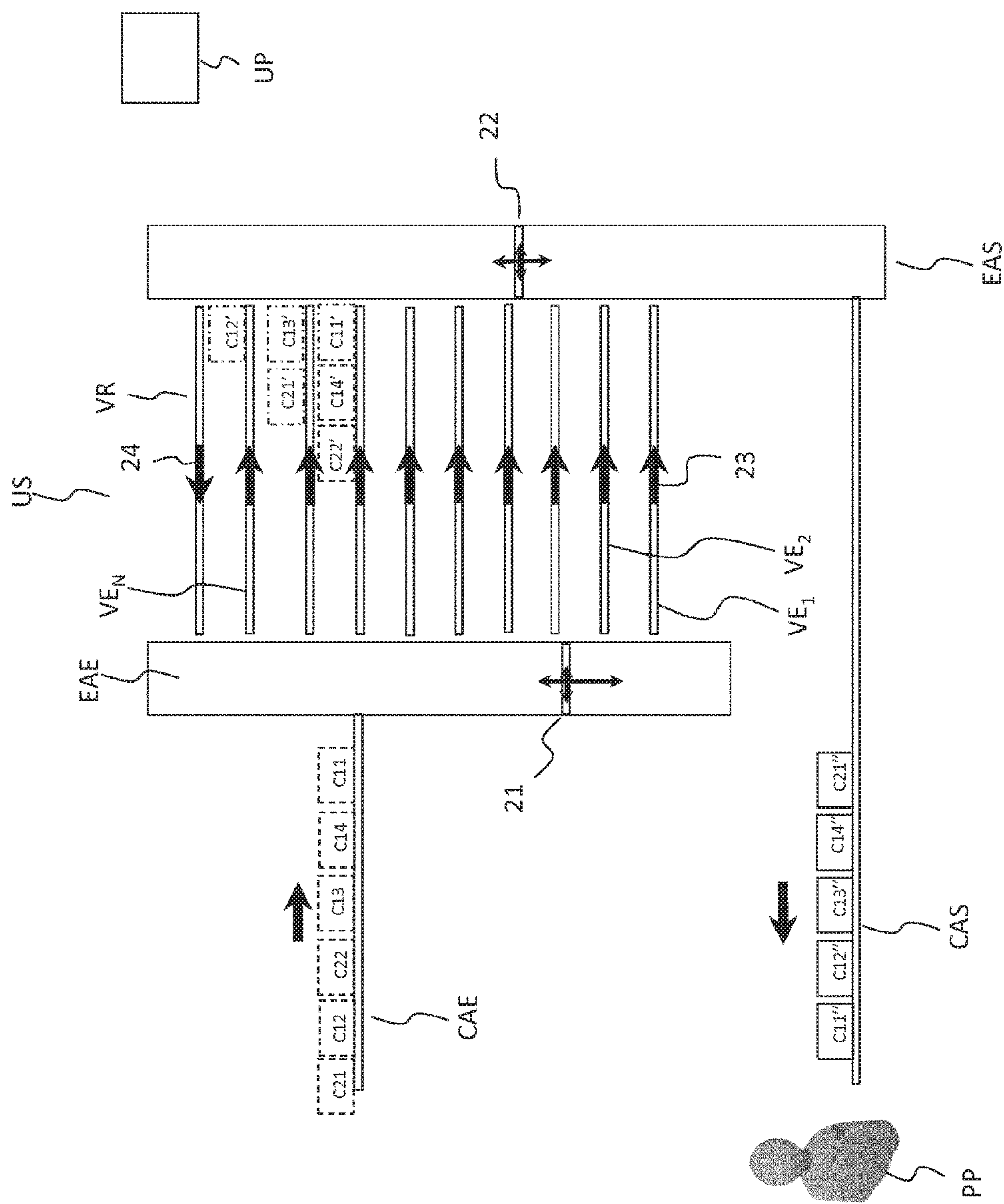

The exiting forward conveyor CAS occupies a position enabling a direct exchange of loads with the exiting reciprocating elevator EAS. In other words, a load can pass directly from one to the other. In the example of FIG. 2, the exiting reciprocating elevator EAS is positioned between the buffer storage unit US and the exiting forward conveyor CAS and the exiting forward conveyor CAS is aligned vertically with the entrance level referenced $VE_1$ of the buffer storage unit US. In variants, the exiting forward conveyor CAS can occupy other vertical positions and can especially be aligned vertically with any one of the N entrance levels $VE_1$ to $VE_N$ of the buffer storage unit US or again with the recirculation level VR. In other variants (especially the one illustrated in FIG. 2*b*), the exiting forward conveyor CAS and the buffer storage unit US are positioned on the same side of the exiting reciprocating elevator EAS (in this case, the exiting forward conveyor CAS is positioned above or beneath the buffer storage unit US).

The management unit UP enables the optimal organization of the movements of loads in the system, and especially on the entering reciprocating elevator EAE and the exiting reciprocating elevator EAS and the buffer storage unit US in order to make source loads available on the exiting forward conveyor according to at least one determined sequence (comprising loads in a desired sequential order). To this end, the management unit UP receives information (especially a load identifier) that are read, on loads passing through different places of the system, by reading devices (not shown) of the barcode reader RFID label reader and other types. These places are for example situated at the extremities of the different conveyors.

More specifically, under the above-mentioned constraint of delivering at least one sequence (comprising loads in a desired sequential order), the management unit UP organizes:

- first movements of loads from the entering forward conveyor CAE to the entering reciprocating elevator EAE;
- second movements of loads from the entering reciprocating elevator EAE to the N entrance levels of the buffer storage unit US;
- third movements of loads from the N entrance levels of the buffer storage unit US to the exiting reciprocating elevator EAS;
- fourth movements of loads from the exiting reciprocating elevator EAS to the exiting forward conveyor CAS;
- fifth movements of loads from the exiting reciprocating elevator EAS to the recirculation level VR; and
- sixth movements of loads from the recirculation level VR to the entering reciprocating elevator EAE.

The entering reciprocating elevator EAE and the exiting reciprocating elevator EAS work simultaneously, thus increasing the working rate of the buffer storage and sequencing system.

Figures 8A, 8B:
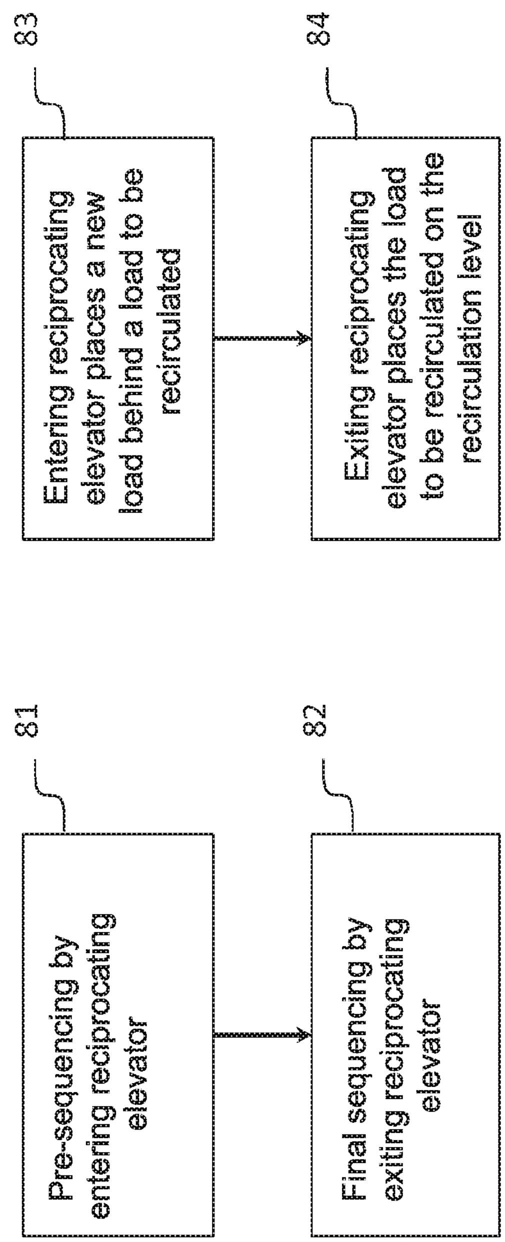
FIGS. 8A and 8B are flowcharts illustrating two algorithms of a method according to one particular embodiment of the invention.

Referring now to FIGS. 8A and 8B (each illustrating a different algorithm), we present a method according to one particular embodiment of the invention implemented by the system of FIG. 2 to generate (at least) one sequence comprising loads in a desired sequential order. More specifically, the management unit UP is configured so that the system executes these two algorithms.

The algorithm illustrated in FIG. 8A comprises steps referenced 81 and 82.

In the step 81, the entering reciprocating elevator EAE carries out a pre-sequencing operation by placing the loads of the sequence at the entrance of the N entrance levels $VE_1$ to $VE_N$ of the buffer storage unit US in compliance with the first set of rules comprising, in one particular implementation, the following rules:

- First rule (R1): on each of the N entrance levels, a given load possessing a given rank within the sequence should not be preceded by any load of a rank strictly higher than the given rank (several loads can have the same rank within the sequence).
- Second rule (R2): if, for a load, several entrance levels enable compliance with the first rule (i.e. several possible responses), the load is placed on the level for which the difference between the rank of the load to be stored and the highest rank of the loads presented at the entrance level is the smallest.
- Third rule (R3): should the second rule return several possible responses, the choice among these responses is made according to an additional criterion or several successive additional criteria (the following criterion being applied in case of a plurality of possible responses to the current criterion). Examples of additional criteria: the entrance level on which there are the fewest loads present, the entrance level for which the distance to be traveled is the smallest, any unspecified level among the possible levels, etc.

Fourth rule (R4): if no response is possible for the rules 1 to 3, and a vacant entrance level is chosen (the rules 1 to 3 apply for non-vacant entrance levels, i.e. levels with at least one load present).

Fifth rule (R5): should the fourth rule return several possible responses, the choice among these rules is made according to an additional criterion or several successive additional criteria (the following criterion being applied in the event of a plurality of possible responses to the current criterion). Examples of additional criteria: the entrance level for which the distance to be traveled is the smallest, any unspecified level among the possible levels, etc.

Sixth rule (R6): if no response is possible for the rules 1 to 3, the recirculation process described in detail here below (with reference to FIG. 8B) is applied. In brief, this recirculation process will, all the same, enable the load to be placed on one of the N entrance levels $VE_1$ to $VE_N$, but one or more loads already present will have to be recirculated. For each load to be recirculated that comes out of the recirculation level VR, the step 81 is launched.

At the step 82, the exiting reciprocating elevator EAS carries out a final sequencing in picking loads from the sequence exiting the N entrance levels $VE_1$ to $VE_N$ of the buffer storage unit US in the desired sequential order.

In other words, the sequencing (ordering) function is shared between the entering reciprocating elevator EAE (which carries out the pre-sequencing) and the exiting reciprocating elevator EAS (which carries out the final sequencing). This enables the buffer storage and load sequencing system to work at a high rate (directly linked to the work rate of the entering and exiting reciprocating elevators).

Thus, in the example illustrated in FIG. 2, the sequence to be reconstituted on the exiting forward conveyor CAS is deemed to comprise the following loads in the order given: C11, C12, C13, C14, C21 and C22. The entering reciprocating elevator EAE receives the loads without any order (C11, C14, C13, C22, C12 and C21). It carries out a pre-sequencing operation in performing the following successive actions:

- placing the load C11 on the entrance level $VE_1$;
- placing the load C14 on the entrance level $VE_1$;
- placing the load C13 on the entrance level $VE_2$ (it cannot place it on the entrance level $VE_1$ because the load C14 is already there);
- placing the load C22 on the entrance level $VE_1$;
- placing the load C12 on the entrance level $VE_3$ (it cannot place it on the entrance level $VE_1$ because the loads C14 and C22 are already there, nor can it place it on the entrance level $VE_2$ because the load C13 is already there);
- placing the load C21 on the entrance level $VE_2$ (it cannot place it on the entrance level $VE_1$ because the load C22 is already there).

The algorithm illustrated in FIG. 8B describes the recirculation process mentioned further above comprising the steps referenced 83 and 84. It is executed if, for a given load, there is no entrance level N enabling the entering reciprocating elevator to comply with the first rule (cf. step 81 of FIG. 8A).

FIG. 10 illustrates an example of a configuration requiring the execution of the recirculation process. The entering reciprocating elevator EAE receives loads without any order (C11, C14, C13, C22, C12, C21 and C10). The loads C11, C14, C13, C22, C12 and C21 have been placed (according to the first set of rules) as illustrated in FIG. 10. By contrast, the load C10 requires the execution of the recirculation process.

At the step 83, the entering reciprocating elevator places, all the same, the given load (C10) at the entrance to a given entrance level among the N entrance levels. The given load (C10) is therefore preceded at the given entrance level by (at least) one load of a rank higher than the given rank, called (at least one) load to be recirculated.

The choice of the entrance level on which the given load (C10) is placed meets for example a second set of rules comprising, in one particular implementation, the following rules:

First rule (R1'): search for the entrance level or levels having the highest score. The score of a given entrance level is for example the sum (other functions can be envisaged) of the scores assigned to the loads present at a given entrance level. The score of a given load is for example of the R×K type (other formulae combining R and K can be envisaged), with R being the rank of the load and K being a coefficient that is a function of the physical situation of the given load relative to the other loads of the same entrance level and relative to the exiting reciprocating elevator EAS.

Second rule (R2'): should the first rule return several possible responses, the choice among these responses will be made according to an additional criterion or several successive additional criteria (the following criterion being applied in the event of a plurality of possible responses to the current criterion). Examples of additional criteria: the entrance level on which the load is situated with the highest rank number, the entrance level on which there are the fewest loads present, the entrance level for which the distance to be traveled up to the recirculation level is the smallest, any unspecified level among the possible levels, etc.

In the example illustrated in FIG. 10, for the application of the first rule (R1'), three values of K are considered: K=1000, K=100 and K=10, corresponding to three positions from the closest to the most distant to the exiting reciprocating elevator EAS. To know at which entrance level the load C10 is to be placed, we calculate the score of each of the entrance levels. The score of the entrance level $VE_1$ (on which the loads C11, C14 and C22 are present) is: 22*10+14*100+11*1000=12620. The score of the entrance level $VE_2$ (on which the loads C13 and C21 are present) is: 21*100+13*1000=15100. The score of the entrance level $VE_3$ (on which the load C12 is present) is: 12*1000=12000. It is therefore the entrance level $VE_2$ that has the highest score and is chosen to have the load C10 placed on it.

At the step 84, the exiting reciprocating elevator transfers the load to be recirculated from an exit of the given entrance level to an entrance of the recirculation level VR.

By enabling a recirculation (i.e. a return to the entering reciprocating elevator EAE and therefore potentially to the entrance of the buffer storage unit US) of certain loads that exit the buffer storage unit, the recirculation level VR makes it possible to avoid a situation of blockage of the buffer storage unit (without increasing its number N of entrance levels).

In FIG. 2 (and also in the other figures described here below), certain loads are referenced with alphanumerical characters ("C11", "C12", "C13", etc.) to illustrate the working of the system. In order to show the successive positions of a same load on the same figure, the following notation is used: for a first position, the load is referenced with only its associated alphanumeric characters (for example, "C11"), for a second position, the reference of the load is complemented with the prime symbol (for example, "C11'"), for a third position, the load is referenced with the double prime symbol (for example, "C11""), etc.

Figure 3:
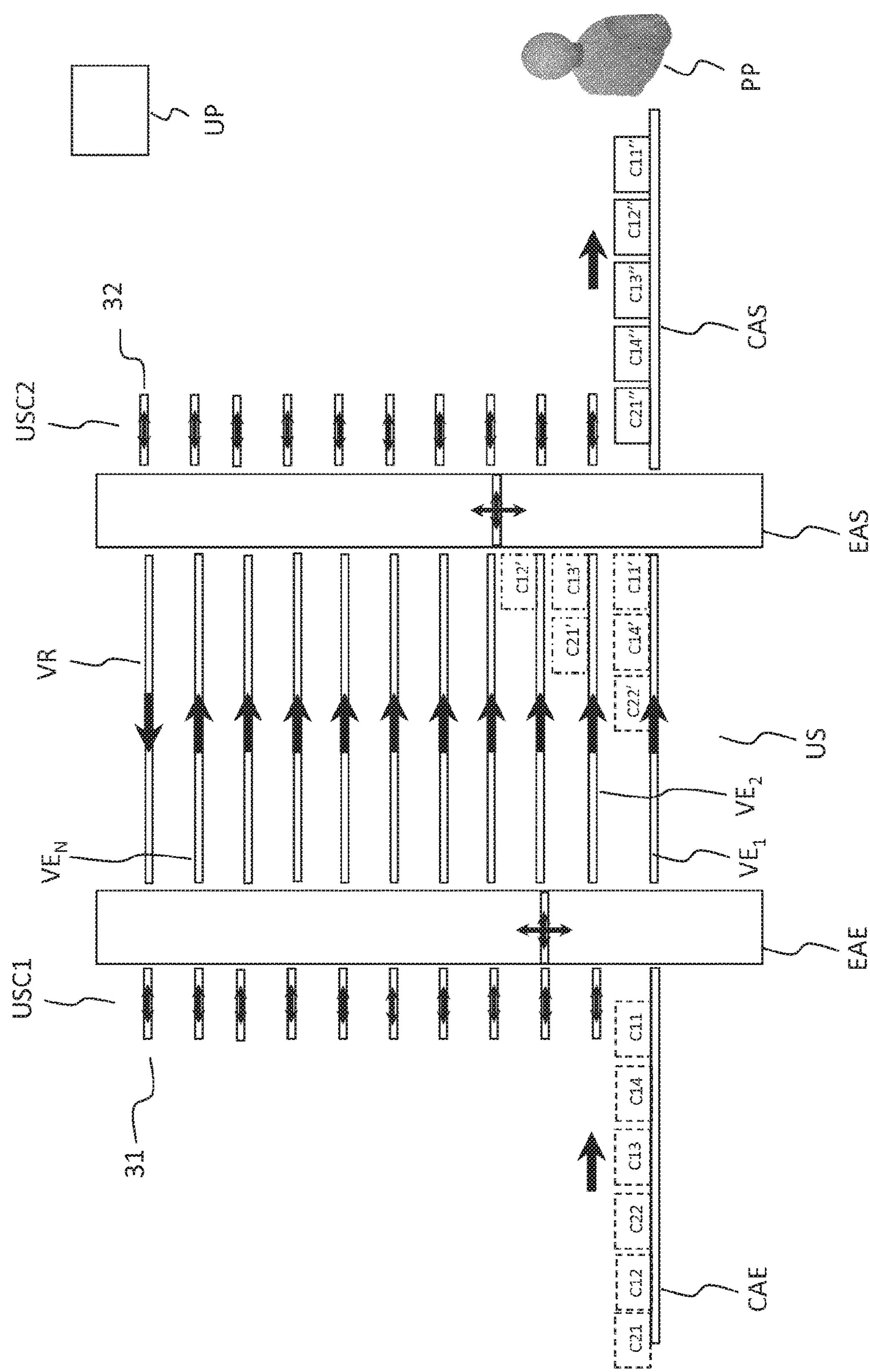
FIG. 3 is a side view of a second example of a buffer storage and load sequencing system according to the invention.

FIG. 3 illustrates a second example of a buffer storage and load sequencing system according to the invention. It can be distinguished from the first example illustrated in FIG. 2 in that it furthermore comprises:

- a first complementary buffer storage unit USC1 comprising a plurality of buffer locations 31 distributed over a plurality of levels and each configured to temporarily receive at least one load coming from the entering reciprocating elevator EAE; and
- a second complementary buffer storage unit USC2 comprising a plurality of buffer locations 32 distributed on a plurality of levels and each configured to temporarily receive at least one load coming from the exiting reciprocating elevator EAS.

The management unit UP also manages the complementary buffer storage units USC1, USC2. It is configured to organize, under the above-mentioned constraint of delivering at least one determined sequence:

- seventh movements of loads between the entering reciprocating elevator EAE and the first complementary buffer storage unit USC1; and
- eighth movements of loads between the exiting reciprocating elevator EAS and the second complementary buffer storage unit USC2.

The first complementary buffer storage unit USC1 increases the buffer storage capacity of the system upstream to the buffer storage unit US. The entering reciprocating elevator EAE can place, on the N entrance levels of the buffer storage unit, loads having different origins: the entering forward conveyor CAE, the first complementary buffer storage unit USC1 and the recirculation level VR.

The second complementary buffer storage unit USC2 makes it possible to increase the buffer storage capacity of the system, downstream from the buffer storage unit US. The exiting reciprocating elevator EAS can place, on the exiting forward conveyor CAS, loads having different origins: the N entrance levels of the buffer storage unit and the second complementary buffer storage unit.

In one variant, one of the complementary buffer storage units USC1 and USC2 is not present.

Figure 4:
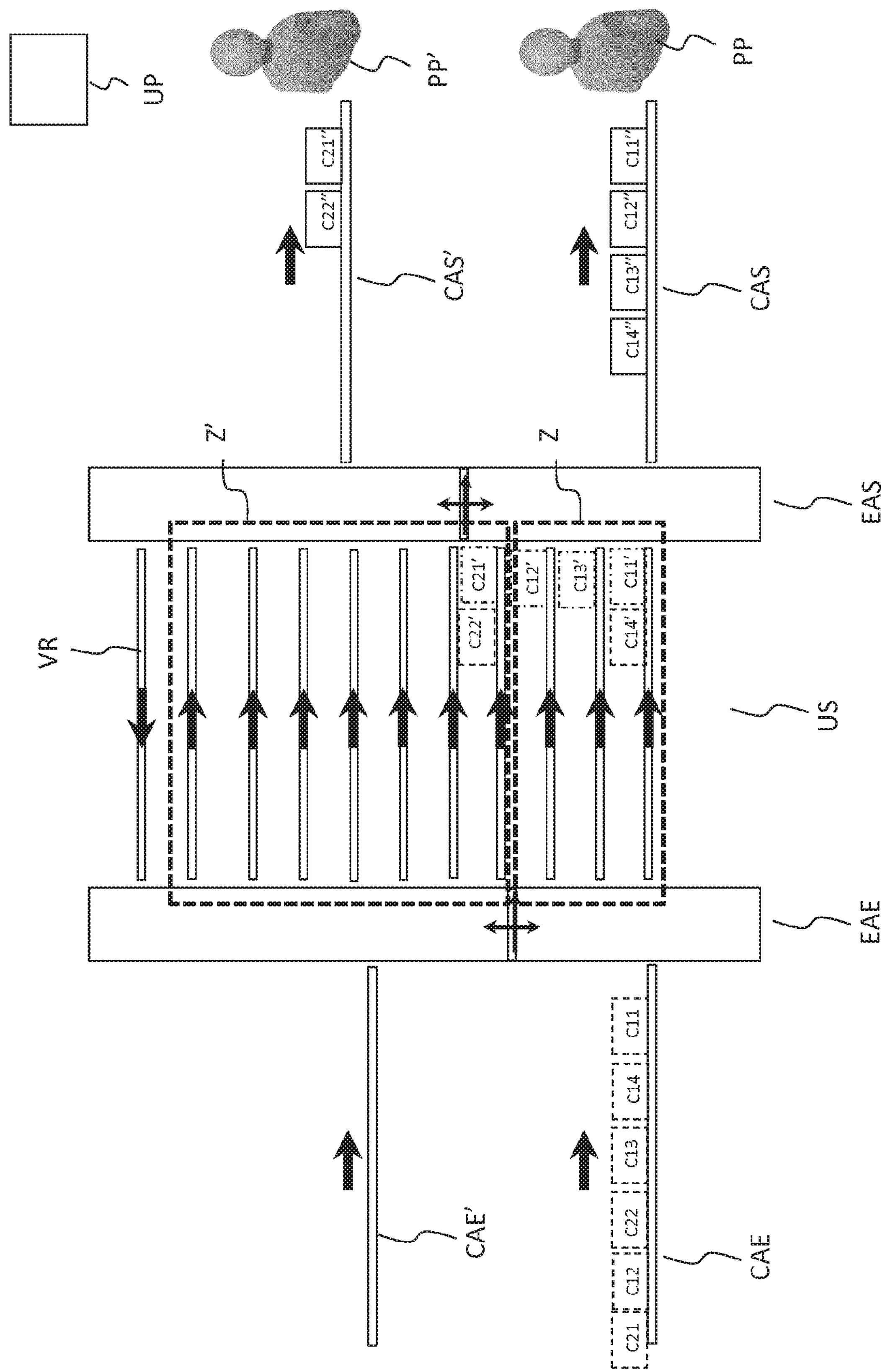
FIG. 4 is a side view of a third example of a buffer storage and load sequencing system according to the invention.

FIG. 4 illustrates the third example of a buffer storage and load sequencing system according to the invention. It can be distinguished from the first example illustrated in FIG. 2 in that:

- it receives non-sequenced loads also through another entering forward conveyor CAE'. The two entering forward conveyors CAE, CAE' are situated on two different levels; and
- it gives sequenced loads also to another preparing station PP', via another exiting forward conveyor CAS'. The two exiting forward conveyors CAS, CAS' are situated on two different levels.

In the example illustrated in FIG. 2, it is deemed to be the case that a first sequence (comprising the loads C11, C12, C13 and C14 in the order given) has to be reconstituted on the exiting forward conveyor referenced CAS, and a second sequence (comprising the loads C21 and C22 in the order given) has to be reconstituted on the exiting forward conveyor referenced CAS'.

In one particular implementation, a dedicated logic zone is assigned to the processing of each sequence (i.e. a zone that is proper to this sequence) within the buffer storage unit US. Thus, it is not possible to mix up the loads of two sequences intended for two preparing stations. This makes it possible to avoid blocking one station if the other one has stopped. Each dedicated logic zone comprises several entrance levels. In the example of FIG. 4, a dedicated logic zone dedicated to the processing of the first sequence is referenced Z and comprises the first four entrance levels in starting from the bottom, and the one dedicated to the processing of the second sequence is referenced Z' and comprises the seven other entrance levels. In order to optimize the use of the N entrance levels $VE_1$ to $VE_N$ of the buffer storage unit US, the composition of each logic zone is modified dynamically. For example, a vacant entrance level is assigned to the processing of a sequence (and therefore does not form part of the logic zone dedicated to this processing) only if a load of this sequence is effectively placed at this entrance level (by the application of one of the first and second sets of rules presented further above). In the same way, as soon as an entrance level becomes vacant again, it is no longer assigned to any processing sequence and therefore no longer forms part of any logic zone.

Other cases can be envisaged, given that the system can comprise one or more entering forward conveyors and one or more exiting forward conveyors. In one variant, the number of entering forward conveyors is greater than two. In another variant, the number of preparing stations (and exiting forward conveyors) is greater than two. In another variant, one and the same exiting forward conveyor CAS is used in combination with an appropriate routing or switching system to serve several preparing stations.

Figures 5A, 5B:
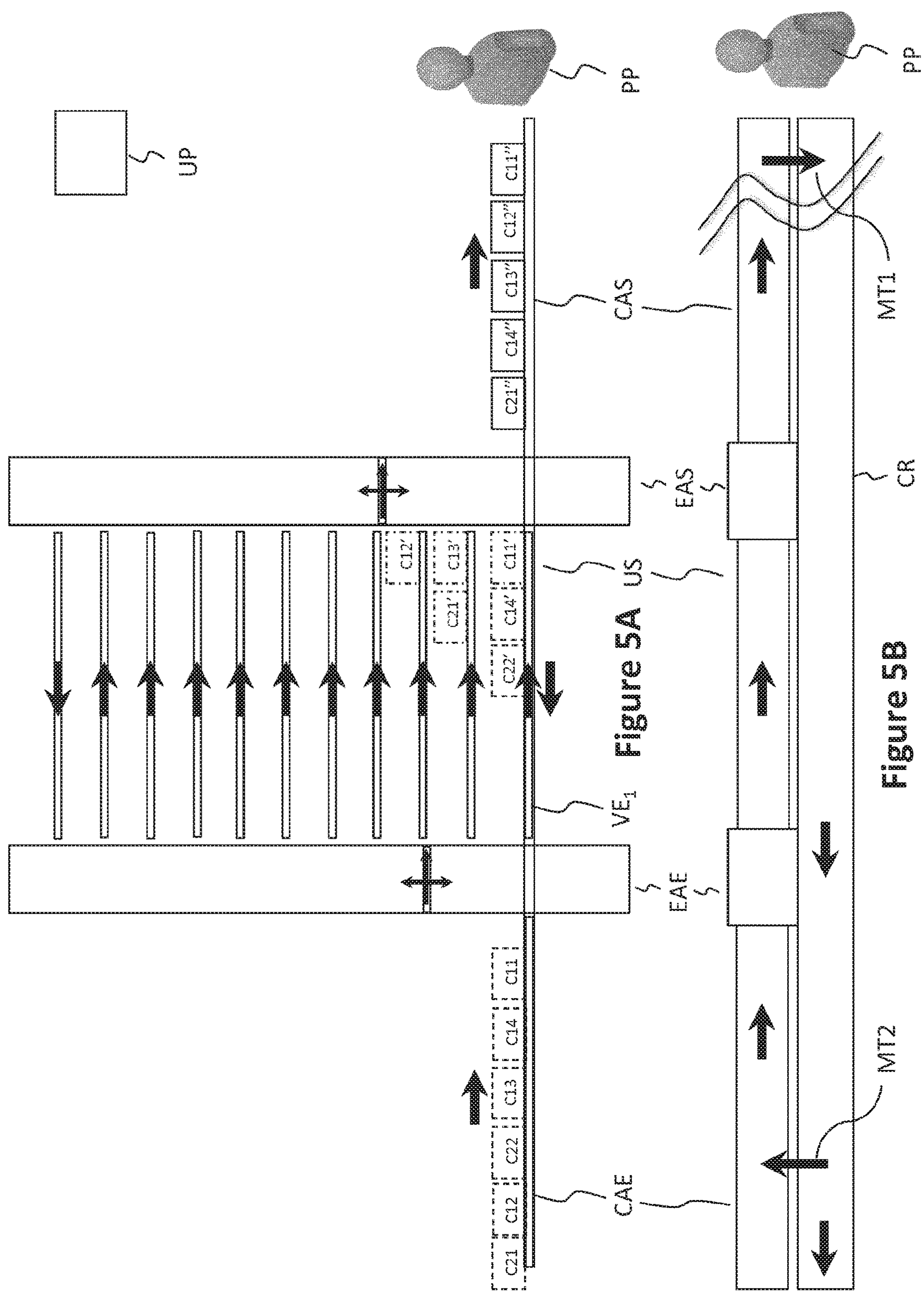
FIGS. 5A and 5B are side and top views respectively of a fourth example of a buffer storage and load sequencing system according to the invention.

FIGS. 5A and 5B illustrate a fourth example of the buffer storage and load sequencing system according to the invention. It can be distinguished from the first example illustrated in FIG. 2 in that it furthermore comprises:

- a return conveyor CR extending in parallel to and on a same horizontal plane as the entering forward conveyor CAE, the first entrance level $VE_1$ of the buffer storage unit US and the exiting forward conveyor CAS;
- first transfer means MT1 (a transfer table for example), configured to make each load pass (after it has been processed by the preparing station PP) from the exiting forward conveyor CAS to the return conveyor CR; and
- second transfer means MT2 (a transfer table for example), configured to make a load pass from the return conveyor CR to the entering forward conveyor CAE (so that this load can be presented to the preparing station in occupying a new desired rank within the sequence).

Figures 6A, 6B:
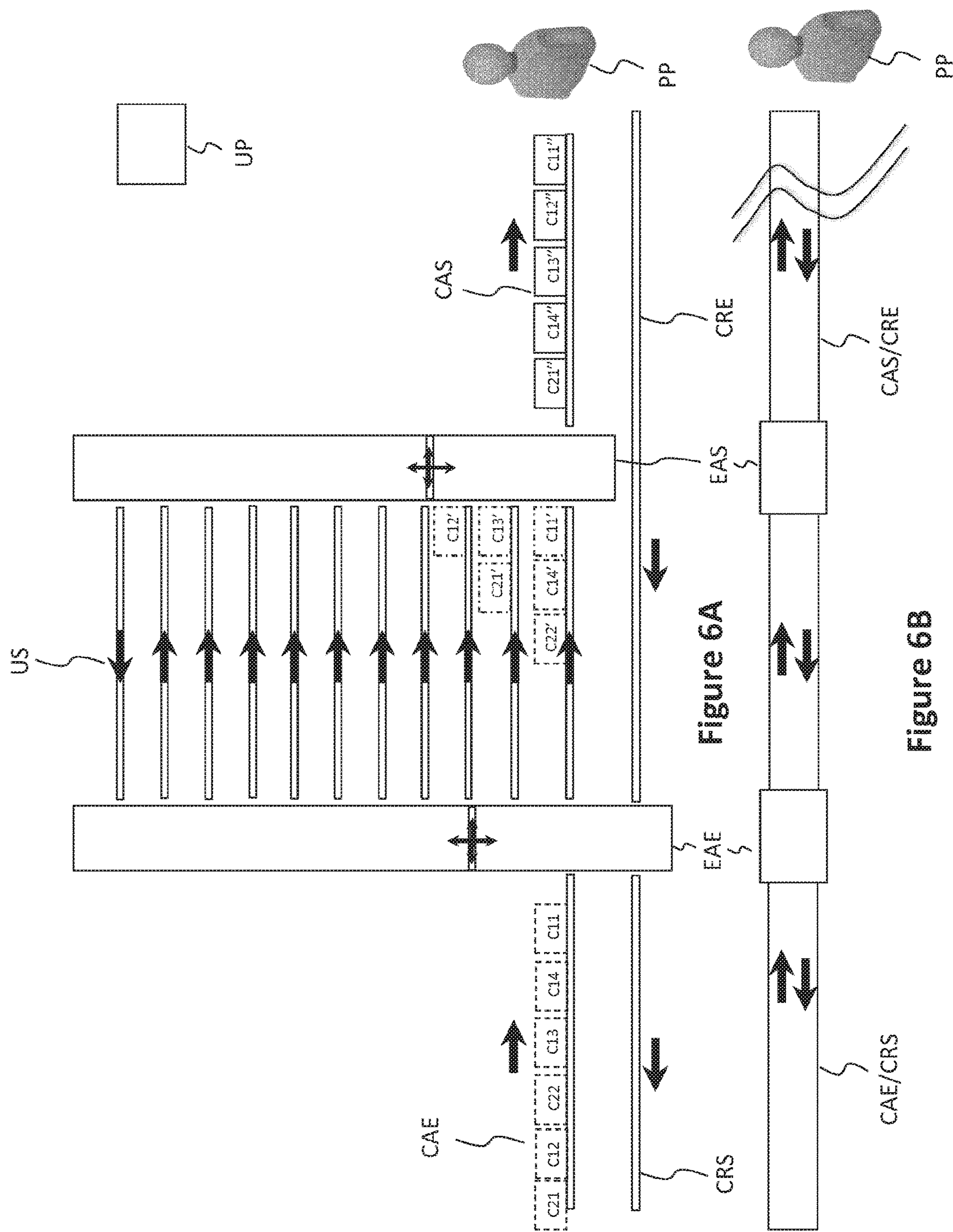
FIGS. 6A and 6B are side and top views respectively of a fifth example of a buffer storage and load sequencing system according to the invention.

FIGS. 6A and 6B illustrate a fifth example of a buffer storage and load sequencing system according to the invention. It can be distinguished from the first example illustrated in FIG. 2 in that it furthermore comprises:

- an entering return conveyor CRE configured for the transportation, from the preparing station PP to the entering reciprocating elevator EAE, of the loads that have been processed by the preparing station. Thus, the returns of loads are possible, minimizing the use of the external unit and further improving the reactivity of the overall system (returns to the buffer storage unit US and, as the case may be, returns to the first complementary buffer storage unit); and an forward return conveyor CRS configured to transport loads to at least one of the entities belonging to the group comprising the above-mentioned external unit (not shown), at least another preparing station (not shown) and at least one other external unit (not shown). Thus, yet other types of load returns are possible.

In the example of FIGS. 6A and 6B, the entering return conveyor CRE is positioned beneath the exiting forward conveyor CAS, the exiting reciprocating elevator EAS and the buffer storage unit US. In one variant, it is positioned above these three elements.

In the example of FIGS. 6A and 6B, the exiting return conveyor CRS is positioned beneath the entering forward conveyor CAE. In one variant, the exiting return conveyor is positioned above the entering forward conveyor CAE.

In the example of FIGS. 6A and 6B, the exiting return conveyor CRS is aligned horizontally with the entering return conveyor CRE to limit the movements of the entering reciprocating elevator EAE. In one variant, there is no such horizontal alignment.

The management unit UP also manages the entering return conveyor CRE and the exiting return conveyor CRS. It is configured to organize, under the above-mentioned constraint of delivering at least one determined sequence:

ninth movements of loads from the entering return conveyor CRE to the entering reciprocating elevator EAE; and tenth movements of loads from the entering reciprocating elevator EAE to at least one of the three above-mentioned entities (external unit, other preparing station or other external unit).

Figure 7:
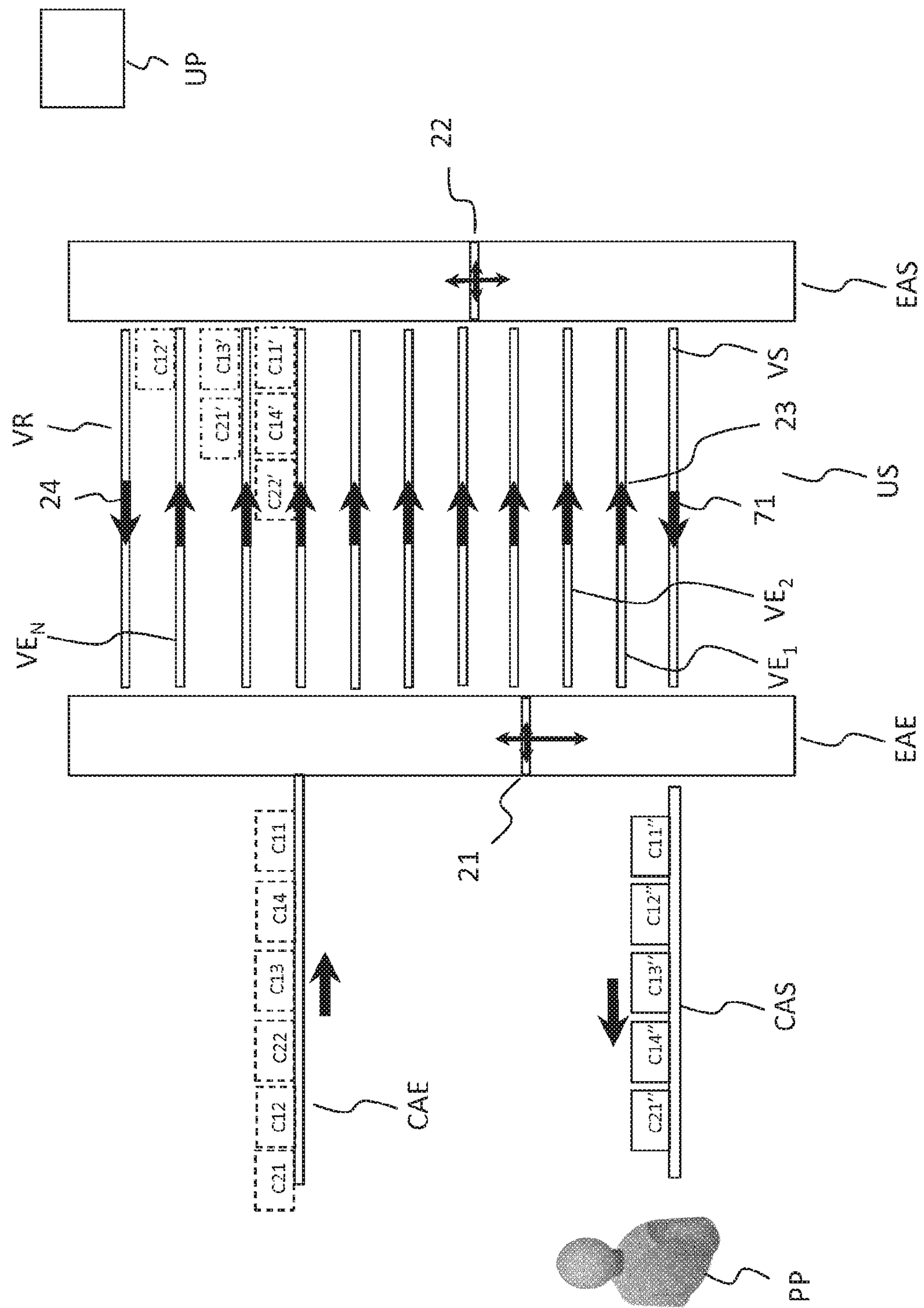
FIG. 7 is a side view of a sixth example of a buffer storage and load sequencing system according to the invention.

FIG. 7 illustrates a sixth example of a buffer storage and load sequencing system according to the invention, it can be distinguished from the first example illustrated in FIG. 2 in that:

the entering forward conveyor CAE and the exiting forward conveyor CAS each occupy a position enabling direct exchange of loads with the entering reciprocating elevator; and the buffer storage unit US comprises (at least) one exit level VS comprising a “first-in first-out” type conveyor along the above-mentioned second direction (indicated in FIG. 7 by a black arrow oriented from right to left and referenced 71).

In the example of FIG. 7, the exiting forward conveyor CAS is positioned beneath the entering forward conveyor CAE and is aligned vertically with the exit level VS of the buffer storage unit US. In variants, the entering forward conveyor CAE and the exiting forward conveyor CAS can occupy other vertical positions.

The movements of loads from the exiting reciprocating elevator EAS to the exiting forward conveyor CAS comprise: movements of loads from the exiting reciprocating elevator EAS to the exit level VS (of the buffer storage unit US), movements of loads from the exit level VS to the entering reciprocating elevator EAE and movements of loads from the entering reciprocating elevator EAE towards the exiting forward conveyor CAS.

FIG. 9 represents an example of a structure of the above mentioned management unit UP according to one particular embodiment of the invention. The management unit UP comprises a random-access memory 93 (for example a RAM), a processing unit 91 equipped for example with a processor and driven by a computer program stored in a read-only memory 92 (for example a ROM or a hard disk drive). At initialization, the code instructions of the computer program are for example loaded into the random-access memory 93 and then executed by the processor of the processing unit 91. The processing unit 91 receives input signals 94, processes them and generates output signals 45.

The input signals 94 include various pieces of information on the working of the general system (comprising especially the external unit or units), the buffer storage and sequencing system and the preparing stations, especially the load identifiers read (by the reading devices such as the barcode reader, RFID label reader etc) on the loads when they pass to different places of the general system (for example to the extremities of the different conveyers).

The output signals 95 comprise various pieces of control information for the management (control) of the devices of the general system (especially within the buffer storage and sequencing system), in order to manage the movements of loads within the general system.

This FIG. 9 illustrates only one particular implementation amongst several possible implementations. Indeed, the management unit UP can be made equally well on a reprogrammable computing machine (a PC computer, a DSP processor or a microcontroller) executing a program comprising a sequence of instructions and/or on a dedicated computation machine (for example a set of logic gates such as an FPGA or an ASIC or any other hardware module). Should the management unit be at least partly implanted on a reprogrammable computing machine, the corresponding program (i.e. the sequence of instructions) could be stored in a detachable storage medium (such as for example a floppy disk, a CD-ROM or a DVD-ROM) or non-detachable storage medium, this storage medium being partially readable or totally readable by a computer or a processor.

Numerous other embodiments can be envisaged without departing from the framework of the invention. It is possible especially to plan for the use of at least one of the complementary buffer storage units USC1, USC2 in any one of the systems of FIGS. 4, 5A/5B, 6A/6B and 7; and/or use several entering forward conveyors CAE and/or several exiting return conveyors CAS in any one of the systems of FIGS. 3, 5A/5B, 6A/6B and 7.

The invention claimed is:

1. A system of buffer storage and load sequencing, configured to receive non-sequenced loads coming from at least one external unit through at least one entering forward horizontal conveyor, and to provide sequenced loads to at least one preparing station through at least one exiting forward horizontal conveyor, said system comprising:

a buffer storage unit comprising N entrance levels disposed vertically, with N≥2, each of the N entrance levels having a single entrance and a single exit and also comprising a “first-in first-out” type horizontal conveyor in a first direction situated between the single entrance and the single exit, with N≥2;

an entering reciprocating vertical elevator and an exiting reciprocating vertical elevator of a vertical discontinuous type to perform vertical movements and positioned respectively vertically so as to be facing the single entrances and facing the single exits of the N entrance levels, the at least one entering forward horizontal conveyor occupying a position enabling a direct exchange of loads with the entering reciprocating vertical elevator, and the at least one exiting forward horizontal conveyor occupying a position enabling a direct exchange of loads with the exiting reciprocating vertical elevator; and a management unit configured to organize, under a constraint of delivering on said at least one exiting forward horizontal conveyor at least one sequence comprising loads in a desired sequential order: first movements of loads from said at least one entering forward horizontal conveyor towards the entering reciprocating vertical elevator, second movements of loads from the entering reciprocating vertical elevator to the single entrances of the N entrance levels of the buffer storage unit, third movements of loads from the single exits of the N entrance levels of the buffer storage unit towards the exiting reciprocating vertical elevator, and fourth movements of loads from the exiting reciprocating vertical elevator to said at least one exiting forward horizontal conveyor.

2. The system according to claim 1, wherein the management unit is configured so that:

the entering reciprocating vertical elevator carries out a pre-sequencing operation in placing the loads of said at least one sequence on the single entrances of the N entrance levels of the buffer storage unit, in compliance with a first rule according to which, on each of the N entrance levels, a given load possessing a given rank within said at least one sequence should not be preceded by another load of a rank higher than the given rank; and the exiting reciprocating vertical elevator carries out a final sequencing operation in picking the loads of said at least one sequence on the single exits of the N entrance levels of the buffer storage unit according to the desired sequencing order.

3. The system according to claim 2, wherein the management unit is configured so that: if, for a load to be stored, several entrance levels enable compliance with the first rule, the load to be stored is placed on an entrance level having the smallest difference between a rank of the load to be stored and a rank that is the highest among the loads presented at the entrance level.

4. The system according to claim 1, wherein the storage unit comprises at least one recirculation level disposed vertically with the N entrance levels and comprising a "first-in first-out" type of conveyor in a second direction opposite to the first direction and having a single input and a single output, and wherein the management unit is configured to organize, under said constraint: fifth movements of loads from the exiting reciprocating vertical elevator to the single entrance of said at least one recirculation level and sixth movements of loads from the single exit of said at least one recirculation level to the entering reciprocating vertical elevator.

5. The system according to claim 4, wherein the management unit is configured so that:

the entering reciprocating vertical elevator carries out a pre-sequencing operation in placing the loads of said at least one sequence on the single entrances of the N entrance levels of the buffer storage unit, in compliance with a first rule according to which, on each of the N entrance levels, a given load possessing a given rank within said at least one sequence should not be preceded by another load of a rank higher than the given rank; and the exiting reciprocating vertical elevator carries out a final sequencing operation in picking the loads of said at least one sequence on the single exits of the N entrance levels of the buffer storage unit according to the desired sequencing order, and wherein the management unit is configured so that if, for a given load, there exists none of the N entrance levels enabling the entering reciprocating vertical elevator to comply with the first rule:

the entering reciprocating vertical elevator places the given load at the single entrance of a given entrance level among the N entrance levels, the given load being preceded on said given entrance level by at least one load of a rank higher than the given rank, called at least one load to be recirculated; and the exiting reciprocating vertical elevator transfers said at least one load to be recirculated from the single exit of the given entrance level to the single entrance of said at least one recirculation level.

6. The system according to claim 5, wherein said given entrance level is chosen because it possesses the highest score among scores associated with each of the N entrance levels, the score associated with an entrance level being a function of the scores associated with the loads present on said entrance level, the score associated with a load being a function of the rank R of the load and of a coefficient K itself a function of a physical situation of the load relative to the other loads of the same entrance level and/or relative to the exiting reciprocating vertical elevator.

7. The system according to claim 1, wherein said at least one entering forward horizontal conveyor and said at least one exiting forward horizontal conveyor each occupy a position enabling a direct exchange of loads with the entering reciprocating vertical elevator, and wherein the storage unit comprises at least one exit level disposed vertically with the N entrance levels and comprising a "first-in first-out" type conveyor along a second direction opposite to the first direction and having a single entrance and a single exit, and wherein the fourth movements of loads from the exiting reciprocating vertical elevator to said at least one exiting forward horizontal conveyor comprise: movements of loads from the exiting reciprocating vertical elevator to the single entrance of said at least one exit level, movements of loads from the single exit of said at least one exit level to the entering reciprocating vertical elevator, and movements of loads from the entering reciprocating vertical elevator to said at least one exiting forward horizontal conveyor.

8. The system according to claim 1, wherein the system comprises at least one complementary buffer storage unit belonging to the group comprising:

at least one first complementary buffer storage unit comprising a plurality of buffer locations, distributed over a plurality of levels and each configured to temporarily receive at least one load coming from the entering reciprocating vertical elevator; and at least one second complementary buffer storage unit comprising a plurality of buffer locations distributed on a plurality of levels and each configured to temporarily receive at least one load coming from the exiting reciprocating vertical elevator, and wherein the management unit is configured to organize, under said constraint: seventh movements of loads between the entering reciprocating vertical elevator and said at least one first complementary buffer storage unit and/or eighth movements of loads between the exiting reciprocating vertical elevator and said at least one second complementary buffer storage unit.

9. The system according to claim 1, wherein the management unit is configured to organize, under said constraint, ninth movements of loads from an entering return conveyor to the entering reciprocating vertical elevator, said entering return conveyor being configured to transport, from said at least one preparing station to the entering reciprocating vertical elevator, loads having been processed by said at least one preparing station.

10. The system according to claim 9, wherein the management unit is configured to organize, under said constraint, tenth movements of loads from the entering reciprocating vertical elevator to an exiting return conveyor, said exiting return conveyor being configured to transport loads to at least one of the entities belonging to the group comprising: said at least one external unit, at least one other preparing station and at least one other external unit.

11. The system according to claim 1, wherein the entering reciprocating vertical elevator and the exiting reciprocating vertical elevator each comprise a single one-load nacelle.

12. The system according to claim 1, configured to provide at least two sequences of loads, each at a specific preparing station and via a specific exiting forward conveyor of the at least one exiting forward horizontal conveyor, wherein the management unit is configured to assign, to the processing of each sequence, a dedicated logic zone within the buffer storage unit, each dedicated logic zone comprising several entrance levels.

13. The system according to claim 12, wherein the management unit is configured to dynamically modify the composition of each logic zone.

14. A method comprising:

generating at least one sequence comprising loads in a desired sequential order by a system of buffer storage and load sequencing, configured to receive non-sequenced loads coming from at least one external unit through at least one entering forward horizontal conveyor, and to provide sequenced loads to at least one preparing station through at least one exiting forward horizontal conveyor, said system comprising:

a buffer storage unit comprising N entrance levels disposed vertically, with N≥2, each of the N entrance levels having a single entrance and a single exit and also comprising a "first-in first-out" type horizontal conveyor in a first direction situated between the single entrance and the single exit;

an entering reciprocating vertical elevator and an exiting reciprocating vertical elevator of a vertical discontinuous type to perform vertical movements and positioned respectively vertically so as to be facing the single entrances and facing the single exits of the N entrance levels, the at least one entering forward horizontal conveyor occupying a position enabling a direct exchange of loads with the entering reciprocating vertical elevator, and the at least one exiting forward horizontal conveyor occupying a position enabling a direct exchange of loads with the exiting reciprocating vertical elevator; and a management unit configured to organize, under a constraint of delivering on said at least one exiting forward horizontal conveyor at least one sequence comprising loads in a desired sequential order: first movements of loads from said at least one entering forward horizontal conveyor towards the entering reciprocating vertical elevator, second movements of loads from the entering reciprocating vertical elevator to the single entrances of the N entrance levels of the buffer storage unit, third movements of loads from the single exits of the N entrance levels of the buffer storage unit towards the exiting reciprocating vertical elevator, and fourth movements of loads from the exiting reciprocating vertical elevator to said at least one exiting forward horizontal conveyor, wherein the generating comprises the following steps:

the entering reciprocating vertical elevator carries out a pre-sequencing operation by placing the loads of said at least one sequence on the single entrances of the N entrance levels of the buffer storage unit, in compliance with a first rule according to which, on each of the N entrance levels, a given load possessing a given rank within said at least one sequence should not be preceded by another load of a rank higher than the given rank; and the exiting reciprocating vertical elevator carries out a final sequencing operation in picking the loads of said at least one sequence on the single exits of the N entrance levels of the buffer storage unit according to the desired sequencing order.

15. The method according to claim 14, wherein:

the storage unit comprises at least one recirculation level disposed vertically with the N entrance levels and comprising a "first-in first-out" type of conveyor in a second direction opposite to the first direction and having a single input and a single output, the management unit is configured to organize, under said constraint: fifth movements of loads from the exiting reciprocating vertical elevator to the single entrance of said at least one recirculation level and sixth movements of loads from the single exit of said at least one recirculation level to the entering reciprocating vertical elevator, the management unit is configured so that:

the entering reciprocating vertical elevator carries out a pre-sequencing operation in placing the loads of said at least one sequence on the single entrances of the N entrance levels of the buffer storage unit, in compliance with a first rule according to which, on each of the N entrance levels, a given load possessing a given rank within said at least one sequence should not be preceded by another load of a rank higher than the given rank; and the exiting reciprocating vertical elevator carries out a final sequencing operation in picking the loads of said at least one sequence on the single exits of the N entrance levels of the buffer storage unit according to the desired sequencing order, the management unit is configured so that if, for a given load, there exists none of the N entrance levels enabling the entering reciprocating vertical elevator to comply with the first rule:

the entering reciprocating vertical elevator places the given load at the single entrance of a given entrance level among the N entrance levels, the given load being preceded on said given entrance level by at least one load of a rank higher than the given rank, called at least one load to be recirculated; and the exiting reciprocating vertical elevator transfers said at least one load to be recirculated from the single exit of the given entrance level to the single entrance of said at least one recirculation level, the method comprises the following steps if, for a given load, there exists none of the N entrance levels enabling the entering reciprocating vertical elevator to comply with the first rule:

the entering reciprocating vertical elevator places the given load at the single entrance of a given entrance level among the N entrance levels, the given load being preceded at said given entrance level by at least one load of a rank higher than the given rank, called at least one load to be recirculated; and the exiting reciprocating vertical elevator transfers said at least one load to be recirculated from the single output of the given entrance level to the entrance of said at least one recirculation level.

16. The method according to claim 14, wherein:

the system is configured to provide at least two sequences of loads, each at a specific preparing station and via a specific exiting forward horizontal conveyor, wherein the management unit is configured to assign, to the processing of each sequence, a dedicated logic zone within the buffer storage unit, each dedicated logic zone comprising several entrance levels, and the method comprises a step of assigning, to the processing of each of said at least two sequences of loads, of a dedicated logic zone within the buffer storage unit, each dedicated logic zone comprising several entrance levels.

* * * * *